United States Patent [19]
Quan

[11] Patent Number: 5,953,417
[45] Date of Patent: Sep. 14, 1999

[54] METHOD AND APPARATUS FOR DIGITALLY REMOVING OR DEFEATING EFFECTS OF COPY PROTECTION SIGNALS FROM A VIDEO SIGNAL

[75] Inventor: Ronald Quan, Cupertino, Calif.

[73] Assignee: Macrovision Corp, Sunnyvale, Calif.

[21] Appl. No.: 09/137,357

[22] Filed: Aug. 20, 1998

Related U.S. Application Data

[63] Continuation of application No. 08/734,412, Oct. 17, 1996, abandoned
[60] Provisional application No. 60/005,681, Oct. 17, 1995.

[51] Int. Cl.[6] .............................. H04N 7/167; H04N 5/91
[52] U.S. Cl. ................................. 380/5; 360/60; 380/10; 380/15; 386/94
[58] Field of Search .................................. 380/5, 10, 15; 360/60; 358/335; 386/94

[56] References Cited

U.S. PATENT DOCUMENTS

| | | |
|---|---|---|
| 4,336,554 | 6/1982 | Okada et al. . |
| 4,577,216 | 3/1986 | Ryan . |
| 4,626,890 | 12/1986 | Ryan . |
| 4,695,901 | 9/1987 | Ryan ............................................ 380/5 |
| 4,742,543 | 5/1988 | Frederiksen ................................. 380/9 |
| 4,819,098 | 4/1989 | Ryan ...................................... 360/37.1 |
| 4,907,093 | 3/1990 | Ryan . |
| 4,937,679 | 6/1990 | Ryan . |
| 5,157,510 | 10/1992 | Quan et al. . |
| 5,194,965 | 3/1993 | Quan et al. . |

*Primary Examiner*—Stephen C. Buczinski
*Attorney, Agent, or Firm*—Gerow Brill; George Almeida

[57] ABSTRACT

Video signals in today's environment exist in both the analog domain and the digital domain. In many instances it may be desirable to delete or reduce the effectiveness of a video signal containing analog copy protection signals while the signals are in the digital domain. The invention uses digital techniques for defeating the effects of the analog copy protected signal while the signal is in the digital domain. The types of copy protection signals includes pseudo sync pulses and AGC pulses. Additionally digital techniques may be used for reducing or eliminating the affects of a chroma copy protection process. A digital video copy protection eliminator allows removal of substantially all pseudo sync pulses and/or AGC pulses in the digital domain. The location of pseudo syncs and/or AGC pulses are determined, while the signal is in the digital domain. These known pixel locations of all or some of the pseudo syncs and/or AGC pulses are used to digitally modify the signal so as to effectively remove the pseudo sync pulses and/or AGC pulses. Digital methods can also be applied to effectively eliminate or correct the chroma (burst phase modulation) protection process and or enhanced video copy protection signals in the digital domain.

19 Claims, 15 Drawing Sheets

METHOD AND APPARATUS FOR DIGITALLY REMOVING OR DEFEATING EFFECTS OF COPY PROTECTION SIGNALS FROM A VIDEO SIGNAL

CROSS REFERENCE TO RELATED APPLICATION

This application is a Continuation of Ser. No. 08/734,412 filed on Oct. 17, 1996, now abandoned, and claims the benefit of U.S. Provisional Application No. 60/005,681 filed Oct. 17, 1995.

BACKGROUND OF THE INVENTION

1. Field of the Invention

The present invention pertains to a method and apparatus for processing a video signal, and more particularly to removing (defeating) effects of copy protection signals from a video signal.

2. Description of the Prior Art

U.S. Pat. No. 4,631,603 ('603) by Ryan, issued on Dec. 23, 1986 entitled METHOD AND APPARATUS FOR PROCESSING A VIDEO SIGNAL SO AS TO PROHIBIT THE MAKING OF ACCEPTABLE VIDEO TAPE RECORDINGS THEREOF describes a video signal that is modified so that a television receiver will still provide a normal color picture from the modified video signal while a videotape recording of the modified video signal produces generally unacceptable pictures and is incorporated by reference.

The invention relies on the fact that typical videocassette recorder's automatic gain control systems cannot distinguish between the normal sync pulses (including equalizing or broad pulses) of a conventional video signal and added pseudo-sync pulses. Pseudo-sync pulses are defined here as pulses which extend down to a normal sync tip level and which have a duration of a least 0.5 microseconds. A plurality of such pseudo-sync pulses is added to the conventional video during the vertical blanking interval, and each of such pseudo-sync pulses is followed by a positive pulse of suitable amplitude and duration. As a result, the automatic gain control system in a videotape recorder will make a fake measurement of video level which causes an improper recording of the video signal. The result is unacceptable picture quality during playback. This approach utilizes positive-going pulses which occur at a time not ordinarily used for black level restoration in typical television receivers, and therefore does not give rise to black level depression in such typical television sets.

U.S. Pat. No. 4,819,098 ('098) by Ryan, issued on Apr. 4, 1989 entitled METHOD AND APPARATUS FOR CLUSTERING MODIFICATIONS MADE TO A VIDEO SIGNAL TO INHIBIT THE MAKING OF ACCEPTABLE VIDEOTAPE RECORDING describes modification of a television monitor receiver still produces a normal picture from the modified signal, whereas a videotape recording of this signal produces generally unacceptable pictures and is incorporated by reference. Videotape recorders have an automatic gain control circuit which measures the sync level in a video signal and develops a gain correction for keeping the video level applied to an FM modulator in the videotape recording system at a fixed, predetermined value. A plurality of positive pulses are added to a video signal with each immediately following a respective trailing edge of a normally occurring sync pulse. These added pulses are clustered at the vertical blanking interval of each field to minimize the affect of the same on the viewability of the picture defined by the signal while still causing the automatic level control circuit in a recorder to asses the video level at many times its actual value. The sync pulses themselves can also be at a reduced level, in order to enhance the effectiveness of the process.

U.S. Pat. No. 4,695,901 ('901) by Ryan, issued on Oct. 2, 1990 entitled METHOD AND APPARATUS FOR REMOVING PSEUDO-SYNC AND/OR AN AGC PULSES FROM A VIDEO SIGNAL describes removing pseudo-sync pulses and AGC pulses that have been added to a video signal to enable acceptable video recording thereof and is hereby incorporated by reference. The added signals previously interfered with acceptable video recording of the video signal because the automatic gain control of videotape recorders sensed false recording levels, while conventional television receivers were unaffected by those modifications to the video sign. Removal of the added pulses permits acceptable video recording of the previously modified video signal. A selectively-operable clipping circuit is used to remove selected negative-value components (i.e. pseudo-sync pulses)from the video signal, while added AGC pulses are effectively blanked from the video signal with an electrically-operated switch. Both the blanking and clipping functions are selectively achieved by sensing both the normal sync pulses of the video signal and the added pseudo-sync pulses. Method and apparatus are disclosed for "cleaning up" video signals modified by either the pseudo-sync pulses alone, the AGC pulses alone, or combinations thereof.

U.S. Pat. No. 4,336,554 ('554) by Okada et al., issued on Jan. 21, 1992 entitled CODE SIGNAL BLANKING APPARATUS (incorporated by reference) describes a code signal blanking apparatus comprising a switching means operative during a given period of a vertical blanking period of a television signal and a reference level setting means for producing an output of the reference level during said given period when the switching circuit is operative. A code signal is blanked by keeping a video signal level of the television signal at the vertical blanking period of the television signal.

U.S. Pat. No. 5,194,965 ('965) by Quan et al., issued on Mar. 16, 1993 entitled METHOD AND APPARATUS FOR DISABLING ANTI-COPY PROTECTION SYSTEM IN VIDEO SIGNALS describes a method and apparatus for disabling the effect of copy-protection signals placed in a recording video signals which is based on differences in the characteristics of television and VCR circuitry and is hereby incorporated by reference. Copy-protect signals include pseudo-sync pulses and/or added AGC pulses in the blanking interval of a video signal. The specific method described includes altering the level of the video signal during the vertical blanking interval, e.g. level-shifting, so as to render the copy-protect signals ineffective to prevent unauthorized copying by a VCR. A circuit for achieving the method includes a sync separator for detecting the vertical blanking interval, pulse generating circuits for producing pulses of predetermined widths during the interval, and a summing circuit for summing the predetermined pulses with copy-protect signals thereby to shift their level. An alternative method includes increasing the effective frequency of the copy-protect signals during the vertical blanking interval so as to achieve attenuation and/or low-pass filtering in the VCR circuitry to thereby render the signals ineffective in preventing copying. A circuit for achieving this method includes pulse narrowing and/or pulse multiplication circuitry which effectively increases the high-frequency content of the pseudo-sync and/or AGC pulses.

U.S. Pat. No. 5,157,510 ('510) by Quan et al., issued on Oct. 20, 1992 entitled METHOD AND APPARATUS FOR DISABLING ANTI-COPY PROTECTION SYSTEM IN VIDEO SIGNALS USING PULSE NARROWING (incorporated by reference) describes method and apparatus for disabling the effects of copy-protect signals added to a video signal using differences in the characteristics of television and VCR circuitry. Copy-protect signals as described include pseudo-sync pulses and/or added AGC pulses in the vertical blanking intervals of a video signal. The specific method described includes increasing the effective frequency of the copy-protect signals during the vertical blanking intervals so as to achieve attenuation and/or low pass filtering in the VCR circuitry to thereby render the signals ineffective in preventing copying. A circuit for achieving this method comprises pulse narrowing and/or pulse multiplication circuitry which effectively increases the high-frequency content of the pseudo-sync and/or AGC pulses.

U.S. patent application Ser. No. 08/433,283 ('283) entitled "VIDEO COPY PROTECTION PROCESS ENHANCEMENT AND VERTICAL PICTURE DISTORTIONS," by Quan filed on May 2, 1995 which is incorporated by reference, discloses defeating the affects of the signal generated by the '603 patent by modifying the relative amplitudes of the pseudo sync pulses to the normal sync pulse so that synchronizing pulse detection system within a recorder will only detect the normal synchronizing pulses, thus permitting normal recording of said copy protection signal.

U.S. patent application Ser. No. 08/435,575 ('575) entitled "VIDEO COPY PROTECTION PROCESS ENHANCEMENT AND VERTICAL PICTURE DISTORTIONS," by Quan filed on May 5, 1995 which is incorporated by reference, discloses various defeat mechanisms the affects of the signal generated by the '603 patent to permit normal recording of said copy protection signal.

U.S. Pat. No. 4,907,093 ('093) entitled "Method and Apparatus for Preventing The Copying of a Video Program," which is incorporated by reference, discloses a method and apparatus for detecting the ordered pairs of pseudo-sync pulses and white pulses described in the '603 patent and disabling the recording function of a video cassette recorder. The '093 patent discloses several detection methods.

U.S. Pat. No. 4,577,216, "Method and Apparatus For Processing a Video Signal," John O. Ryan, issued Mar. 18, 1986 and incorporated by reference, discloses modifying a color video signal to inhibit the making of acceptable video recordings thereof. A conventional television receiver produces a normal color picture from the modified signal. However, the resultant color picture from a subsequent video tape recording shows variations in the color fidelity that appear as bands or stripes of color error. Colloquially the modifications are called the "color stripe system" or the "color stripe process". Commercial embodiments of the teachings of this patent typically limit the number of video lines per field having the induced color error or color stripes.

Color video signals (both in the NTSC and PAL TV systems) include what is called a color burst. The color stripe system modifies the color burst. The suppression of the color subcarrier signal at the TV transmitter requires that the color TV receiver include (in NTSC) a 3.58 MHz oscillator which is used during demodulation to reinsert the color subcarrier signal and restore the color signal to its original form. Both the frequency and phase of this reinserted subcarrier signal are critical for color reproduction. Therefore, it is necessary to synchronize the color TV receiver's local 3.58 MHz oscillator so that its frequency and phase are in step with the subcarrier signal at the transmitter.

This synchronization is accomplished by transmitting a small sample of the transmitter's 3.58 MHz subcarrier signal during the back porch interval of the horizontal blanking pulse. The horizontal sync pulse, the front porch and blanking interval duration are essentially the same as that for black and white TV. However, during color TV transmission (both broadcast and cable) 8 to 10 cycles of the 3.58 MHz subcarrier that is to be used as the color sync signal are superimposed on the back porch. This color sync signal is referred to as the "color burst" or "burst". The color burst peak-to-peak amplitude is normally the same amplitude as the horizontal sync pulse.

In one commercial embodiment of the color stripe process, no color burst phase (stripe) modification appears in the video lines that have a color burst signal during the vertical blanking interval. These are lines 10 to 21 in an NTSC signal and corresponding lines in a PAL signal. The color stripe modifications occur in bands of four to five video lines of the viewable TV field followed by bands of eight to ten video lines without the color stripe modulation. The location of the bands is fixed ("stationary") field-to-field. This color stripe process has been found to be quite effective for cable television, especially when combined with the teachings of U.S. Pat. No. 4,631,603 also invented by John O. Ryan and incorporated herein by reference.

In NTSC TV, the start of color burst is defined by the zero-crossing (positive or negative slope) that precedes the first half cycle of subcarrier (color burst) that is 50% or greater of the color burst amplitude. It is to be understood that the color stripe process shifts the phase of the color burst cycles relative to their nominal (correct) position.

Further, the amount of phase shift in the color stripe process can vary from e.g. 20° to 180°; the more phase shift, the greater the visual effect in terms of color shift. In a color stripe process for PAL TV, a somewhat greater phase shift (e.g. 40° to 180°) is used to be effective.

Other variations of the Colorstripe™ process are described in the following provisional applications: Ser. No. 60/010015 entitled AN IMPROVED METHOD AND APPARATUS FOR MODIFYING THE COLOR BURST TO PROHIBIT VIDEO TAPE RECORDING by William J. Wrobleski, Ser. No. 60/010779 by William J. Wrobleski, entitled AN ADVANCED COLOR BURST METHOD AND APPARATUS FOR MODIFYING THE COLOR BURST TO PROHIBIT VIDEOTAPE RECORDING, Ser. No. 60/014246 by William J. Wrobleski, entitled A METHOD AND SYSTEM OF COPY PROTECTION USING AN ADVANCED AND SPLIT COLOR BURST (all incorporated by reference).

Methods and apparatuses for defeating the effects of the color burst modifications of the '216 patent and others are described in U.S. Pat. No. 4,626,890 entitled "Method and Apparatus for Removing Phase Modulation From the Color Burst," (incorporated by reference). Methods and apparatuses for detecting a color stripe signal and for additional defeat methods and apparatuses are described in application Ser. No. 08/438,155, filed May 9, 1995 entitled METHOD AND APPARATUS FOR DEFEATING EFFECTS OF COLOR BURST MODIFICATIONS TO A VIDEO SIGNAL by Ronald Quan and John O. Ryan. Application Ser. No. 60/010015, 60/0010779, 60/014246 and 08/438,155 ('155)are incorporated by reference.

U.S. Pat. No. 4,626,890, "Method and Apparatus For Removing Phase Modulation From the Color Burst", John O. Ryan, issued Dec. 2, 1986 and incorporated by reference, discloses removing the phase modulation of the U.S. Pat.

No. 4,577,216. This removal is useful in eliminating much of the effects of the process disclosed in U.S. Pat. No. 4,577,216 for recording.

The '155 application by Quan et al. describes a color stripe process for preventing recording of video signals, the color burst present on each line of active video is modified so that any subsequent video tape recording of the video signal shows variations in the color fidelity that appear as undesirable bands or stripes of color error. This color stripe process is defeated first by determining the location of the video lines including the color stripe process, either by prior experimentation or by on-line detection. Then some or all of the lines including the modified color bursts are modified so as to render the overall video signal recordable. The modification is accomplished in a number of ways, including phase shifting the color stripe burst into the correct phase, replacing some of the color stripe bursts or a portion of particular color stripe bursts so that they are no longer effective, and mixing the color stripe burst with color stripe signals of the correct phase so as to eliminate most or all of the phase error present. The modified color bursts are defeated, in other versions, by modifying the horizontal sync pulse signals immediately preceding the modified color bursts so that the modified color bursts are not detected by a VCR and hence have no effect.

All of the defeat methods described in the referenced defeat patents use analog techniques. With the advent of greater use of digital technology, there is a need for digital implementations of these techniques.

SUMMARY

Video signals in today's environment exist in both the analog domain and the digital domain. In many instances it may be desirable to delete or reduce the effectiveness of a video signal containing analog copy protection signals such as those described in the '603, '098 and '216 patents while the signals are in the digital domain. A video pirate may attempt to avoid infringement of one or more of the analog defeat mechanisms referred to above by converting the analog signal to the digital domain and instituting defeat mechanisms in the digital domain.

The present inventor has determined that improvements are possible on the teachings of above mentioned analog defeat mechanisms, especially by the use of digital techniques and defeating the effects of the analog copy protected signal while the signal is in the digital domain. These improvements include defeating the signal generated by the '603 and the '098 patents (pseudo sync and AGC pulses for affecting the AGC system of a recorder). Additionally digital techniques may be used for reducing or eliminating the affects of the signals disclosed in the '216 patent and variations of the Colorstripe™ process described in the '015, '779 and '246 provisional applications.

A digital video copy protection eliminator allows removal of substantially all or sufficient or sufficient portions of pseudo sync pulses and/or AGC pulses in the digital domain. The location of pseudo syncs and/or AGC pulses are determined, while the signal is in the digital domain. These known pixel locations of all or some of the pseudo syncs and/or AGC pulses are used to digitally multiplex (preferably fixed) numbers into a digital multiplex or input as to effectively remove the pseudo sync pulses and/or AGC pulses. The digital processing in may contain Luminance/Chrominance separators and either the Luminance and/or Chrominance digital parts can be used to locate the pseudo sync and/or AGC pulse TV line pixel locations. For example, the luminance portion would contain vertical sync as a start point to count lines in the vertical blanking area where the copy protection signals reside. Also the Chrominance signals would have a digital color burst that starts in each vertical blanking interval as to locate the copy protection signals in the vertical blanking area (interval). The effective elimination of these copy protection pulses can be done to the digital composite signal or just the luminance signal (Y).

Once the copy protection pulses have been located, a "generic" way of effectively eliminating the copy protection pulses in the digital domain is done via a "Circuit ACP". "Circuit ACP" is controlled by the pseudo sync AGC pulse pixel location circuit and can be right before the digital processing or within the digital processing block, This "Circuit ACP" eliminates effectively copy protection in the digital domain by: a) Level shifting and/or pulse narrowing and/or pulse attenuation as described in 4,695, 901 ('901) Ryan, 5,194,965 ('965) and 5,157,510 ('510) Quan et al. (all referenced above and incorporated by reference); Normal composite sync replacement; c) Increased normal composite sync size that is larger in amplitude than the pseudo sync such that sync separators will not detect pseudo syncs (as disclosed in the '965 patent and '283 disclosed above and incorporated by reference); d) Replacement of at least part of pseudo AGC locations with a signal (i.e. flat field) such that a recordable copy is possible.

Several different circuit that can be used "Circuit ACP" are described. Other "circuit ACP" variations can be circuits that turns logic high by sensing the copy protected video's AGC and pseudo sync pulses. Then using timing generators to output pulses shorter in duration of the AGC and pseudo syncs, which in turn is used to narrow the video's AGC pulses and pseudo sync pulses. Of course the copy protection pulses may also be a combination of narrowing, attenuation, level shifting and or modification(i.e. replacement).

This method (and apparatus) is applicable to digital processors such as computer desk top video, digital video tape recording, digital video effects, etc.

Digital methods can also be applied to effectively eliminate or correct the "color stripe" (burst phase modulation) protection process and or enhanced video copy protection signals in the digital domain.

The digital signal may be defined by the relative 8 bit levels of a video signal. For instance, sync tip is defined as 0 and peak white is level 255. Color burst is between level 36 and 109, and blanking level is at 73. The "Colorstripe" signal as described needs to have the enough of the phase shifted color burst corrected to allow acceptable recording to be made. For instance if the phase shift is set for 180 degrees, an EPROM (erasable programmable memory),is used to map the color burst levels numbers to new ones that is a mirror image around level 73(blanking level). For instance if the burst level from Video source during is level 109, the output of the EPROM will be level 36.

The methods and apparatuses for digitally removing or defeating effects of copy protection signals include modifying less than all of the lines in which the copy protection signals are present, but sufficient of the lines so that the acceptable video recording can be made. Also defeating can include modifying sufficient portions of AGC pulses, pseudo sync pulses and/or chroma copy protection signals (i.e. Colorstripe) for a recordable copy

BRIEF DESCRIPTION OF THE DRAWINGS

With reference to the accompanying drawings.

DETAILED DESCRIPTION

The following describes a number of embodiments to defeat the effects of analog copy protection signals while the signal is in the digital domain.

Description of Reducing the Effects of or Eliminating Pseudo Sync and AGC Pulse Copy Protection Signals As discussed above there are two basic type of copy protection signals that are commonly present in video signals. The first includes signals in the Luminance portion of the video signal. The second which will be covered below includes copy protection in the Chrominance portion of the video signal.

Figure 1A:
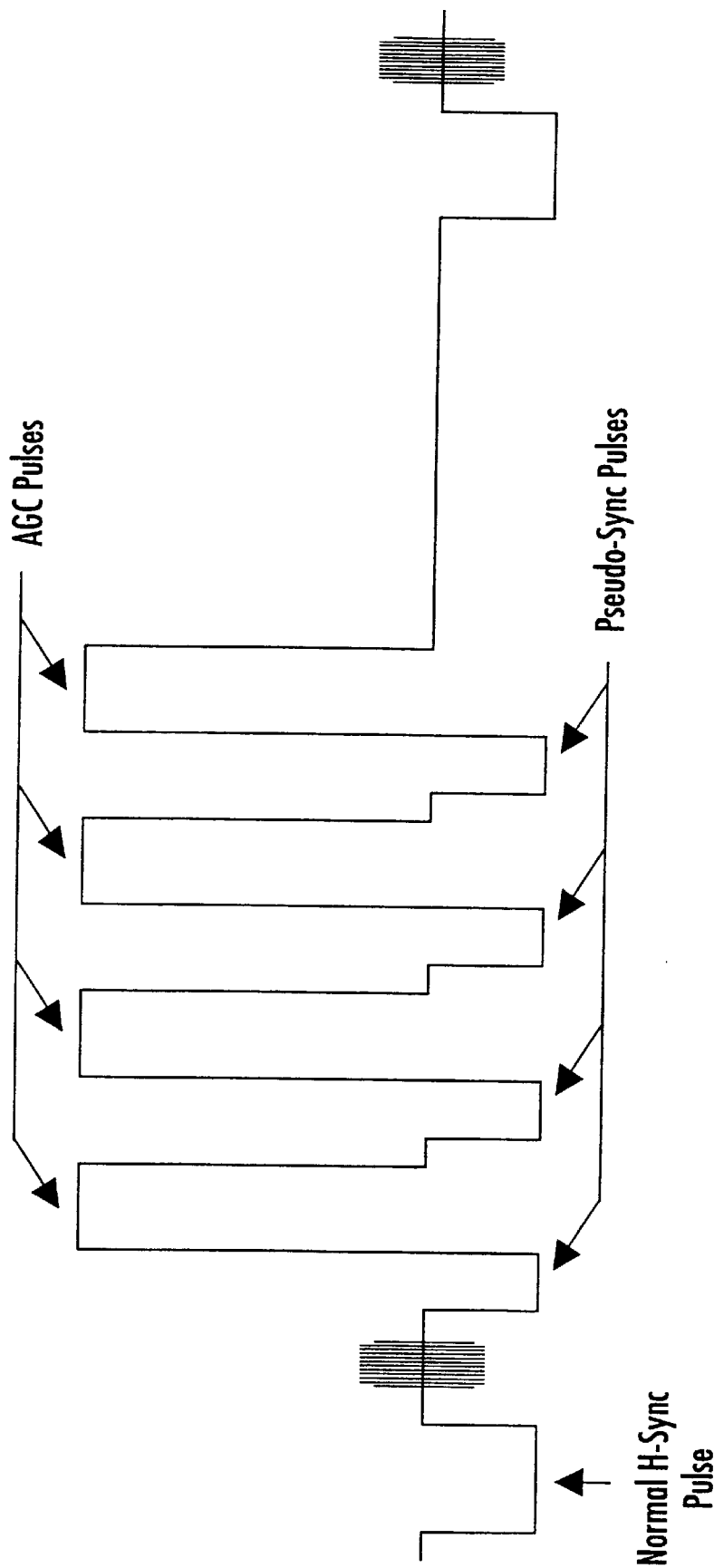
FIG. 1A shows a copy protected signal including pseudo sync pulses and AGC pulses as described in the '603 patent.
Figure 1B:
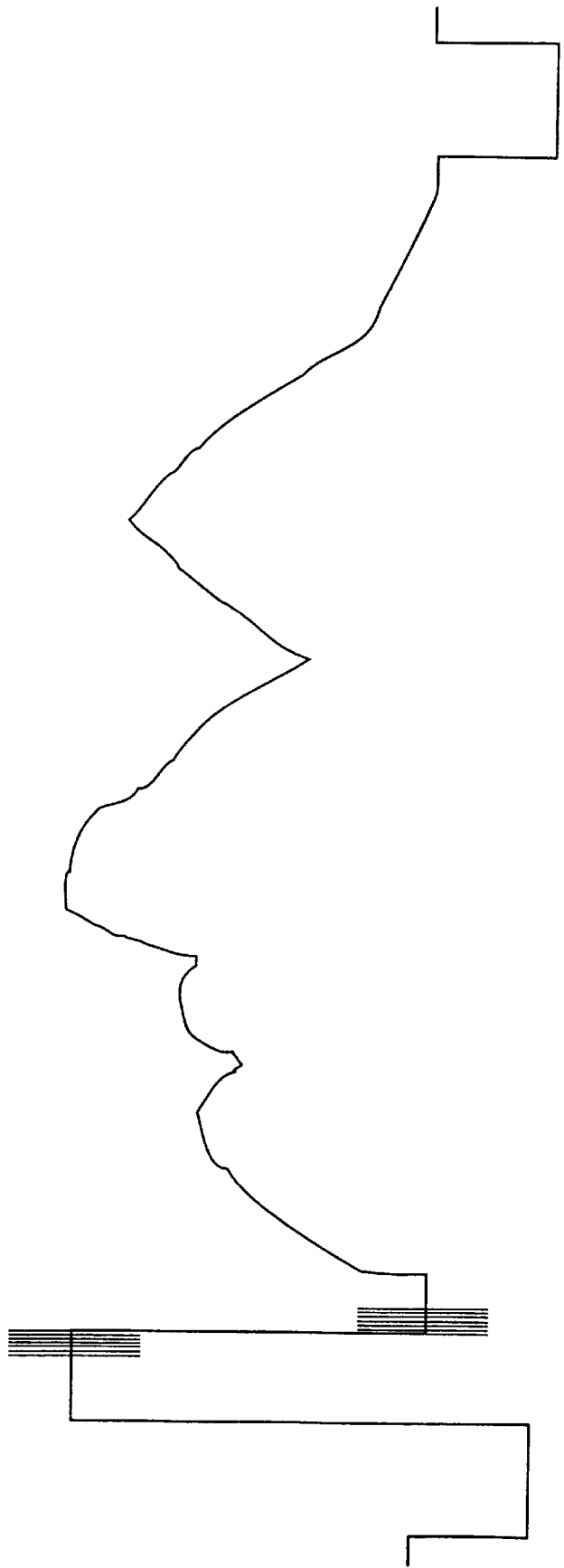
FIG. 1B shows a copy protection signal as described in the '098 patent.

In particular, the type of Luminance copy protection signal for which analog defeat mechanisms are described have been fully described in the '603 and '098 patents by Ryan. See FIGS. 1A and 1B. The elements of these copy protection signals are the combination of either a pseudo sync or a regular sync pulse with an AGC pulse. These pairs sync and AGC pulses are designed to cause the AGC circuitry in a recorder to miscalculate the proper gain setting and thus make an inferior recording. The primary object of the various embodiments listed below is to modify a copy protected signal while the signal is in the digital domain to reduce or eliminate the effects of the copy protection signals.

Figure 2:
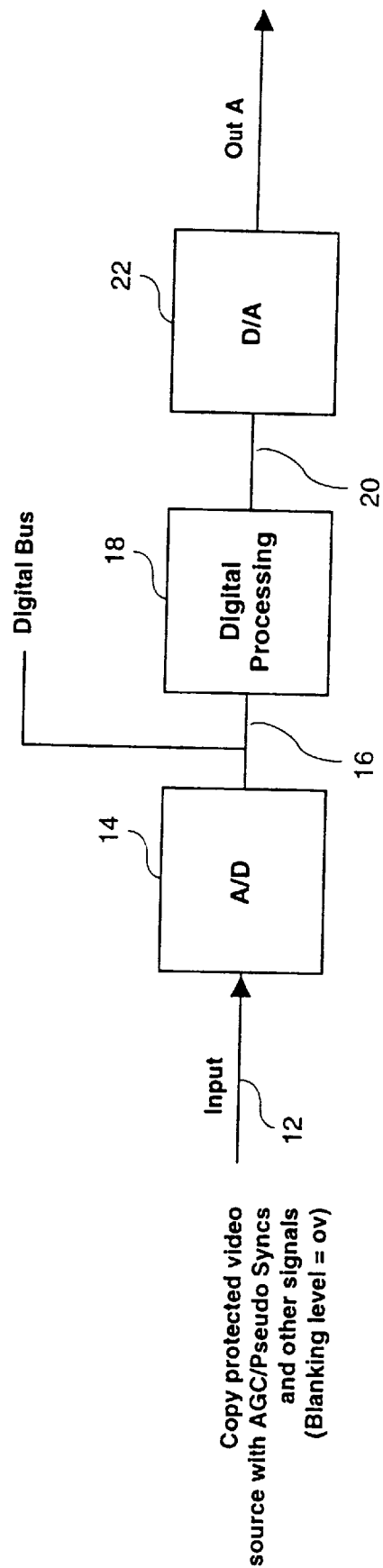
FIG. 2 shows a signal path of a video signal in the digital domain.

As mentioned above, the object of the various embodiments is to remove the effects of copy protection form a video signal while in the digital domain. FIG. 2 shows a conversion of an Analog Signal 12 containing copy protection signals to a Digital Signal 16 using an Analog to Digital converter 14, and then processing said signal in the digital domain 16. Then the Processed Digital Signal 20 is converted back to the analog domain by a Digital to Analog converter 22 by converting the Processed Digital Signal 20 to an Analog Signal using an Analog to Digital Converter 24. The embodiments below may use the output of a digital device containing the copy protected digital signal. For simplicity, each of the embodiments described below may or may not include a Analog to Digital conversion and a Digital to Analog conversion. Each embodiment will operate on the premise that the video signal is in the digital domain.

Figure 3:
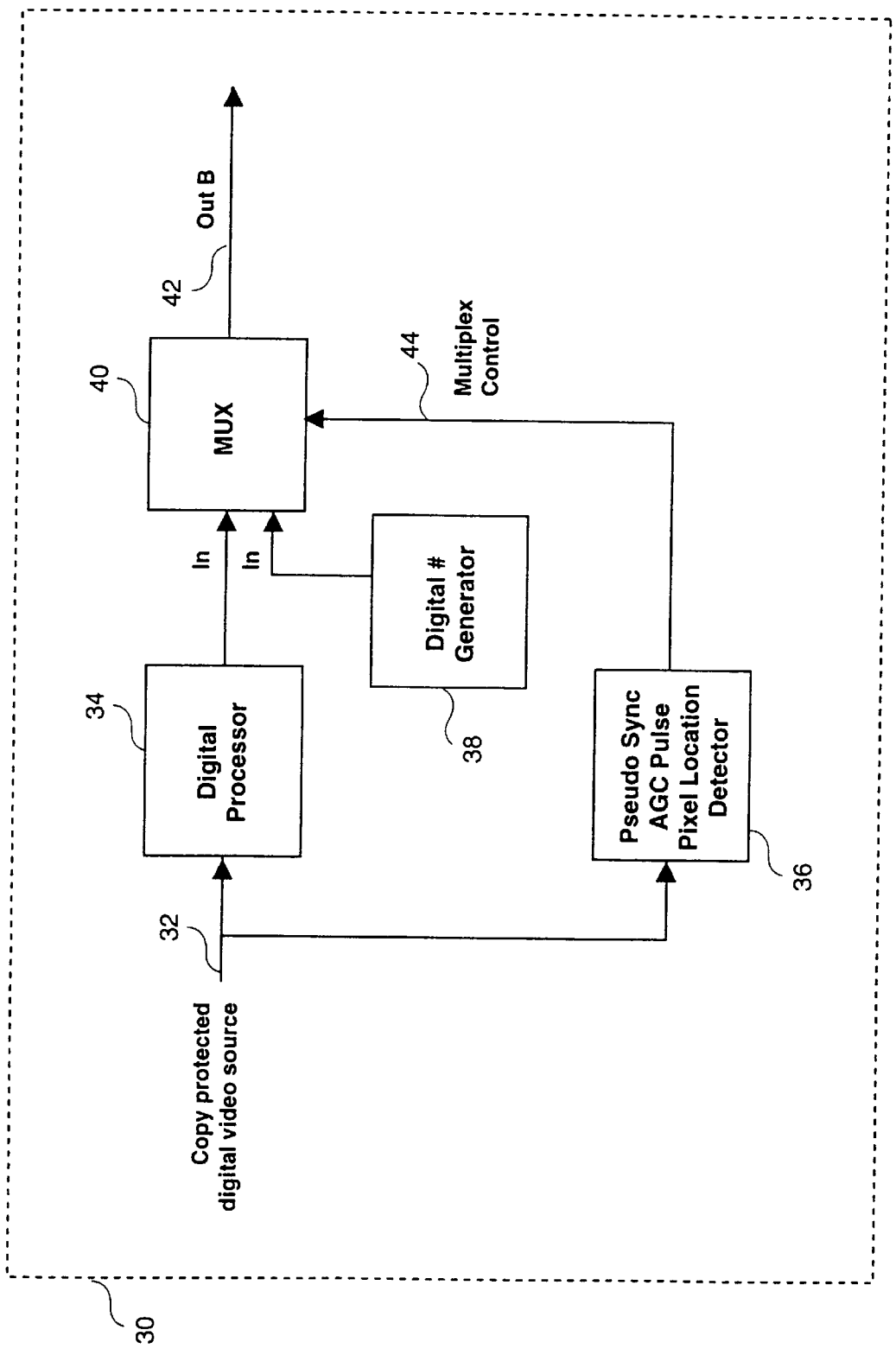
FIG. 3 shows a block diagram of a first embodiment of the invention.

A first general embodiment of the invention is described in FIG. 3. The Device 30 has a Copy Protected Digital Video Input Signal 32 inputted to a Digital Processor 34 and a Pseudo Sync AGC Pulse Location Circuit 36. A Digital Number Generator generates a predetermined digital number representing a condition desired as a replacement for the copy protection pulses. The outputs of the Digital Processor 34 and the Digital Number Generator 38 are coupled to a first and second input of Digital Multiplexer 40. An output of the Pseudo Sync AGC Pulse Pixel Location Generator 36 is inputted to the Digital Multiplexer 40 as a control element of Digital Multplexer 40. The resulting Digital Video Signal 42 has the Pseudo Sync AGC signals modified or removed as instructed by the Multiplex Control Signal 44.

Figure 4:
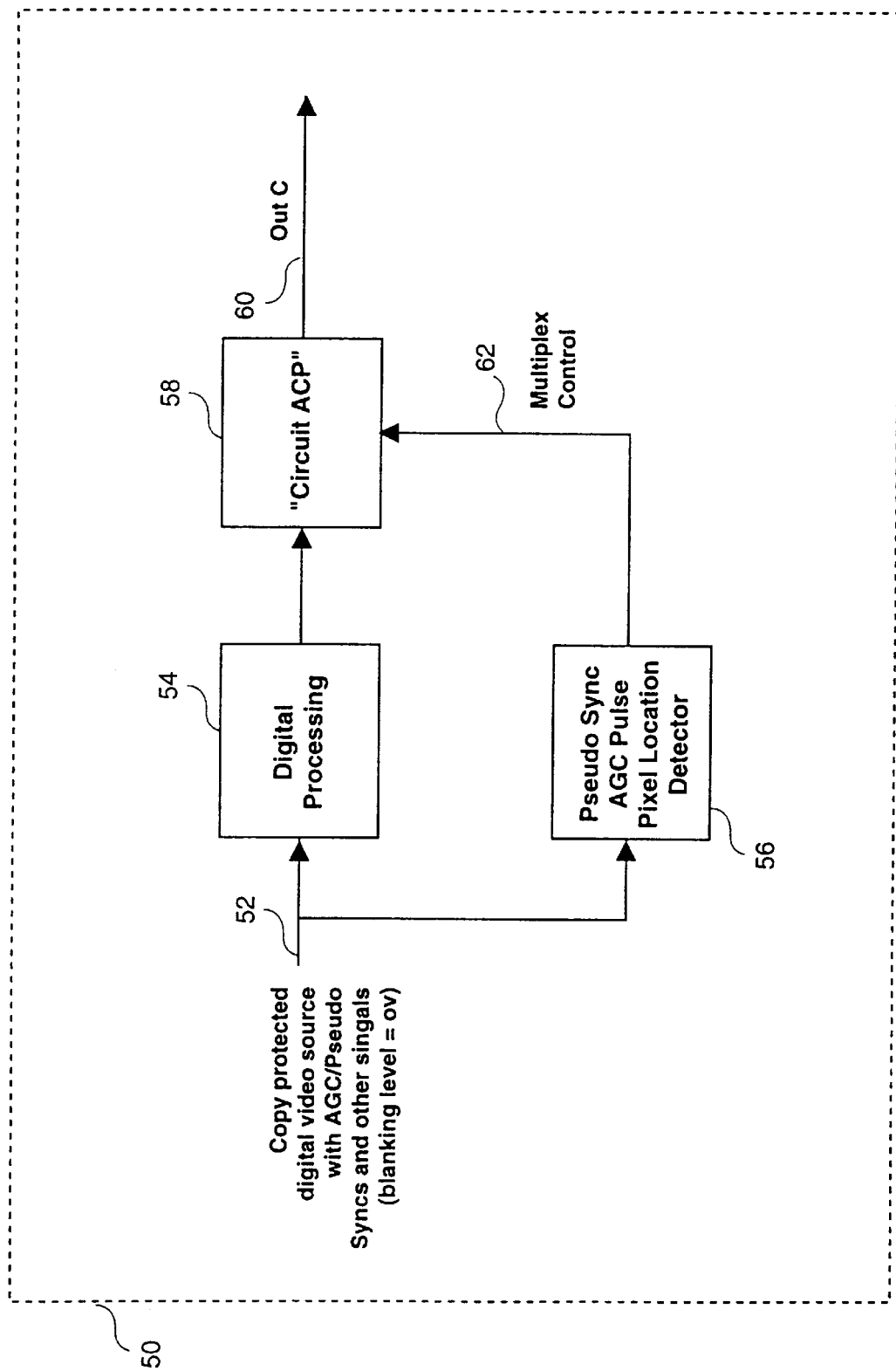
FIG. 4 shows a block diagram of a second embodiment of the invention.

A second general embodiment of the invention is described in FIG. 4. The Device 50 has a Copy Protected Digital Video Input Signal 52 inputted to a Digital Processor 54 and a Pseudo Sync AGC Pulse Location Circuit 56. The output of the Digital Processor 54 is coupled to a first input of a generic circuit called "Circuit ACP" 58. An output of the Pseudo Sync AGC Pulse Pixel Location Detector 56 is inputted to a second input of "Circuit ACP". The details of various embodiments of "Circuit ACP" 58 are described below. The resulting Digital Video Signal 60 has the Pseudo Sync AGC signals modified or removed as instructed by the Multiplex Control Signal 62 and the "Circuit ACP" 58.

The various functions that the "Circuit ACP" perform are:

a) Level shifting and/or pulse narrowing and/or pulse attenuation as described in U.S. Pat. No. 4,695,901 ('901) Ryan, 5,194,965 ('965) and 5,157,510 ('510) Quan et al. (all referenced above and incorporated by reference);

b) Normal composite sync replacement;

c) Increased normal composite sync size that is larger in amplitude than the pseudo sync such that sync separators in recorders will not detect pseudo syncs (as disclosed in the '965 patent and '283 disclosed above and incorporated by reference); and d) Replacement or modification of at least part of pseudo sync and AGC locations with a signal (i.e. flat field) such that a recordable copy is possible.

Note that the digitally derived multiplex control 62 in FIG. 4 can be used to activate analog circuitry at the input analog input or output so as to defeat the copy protection pulses.

Figure 5:
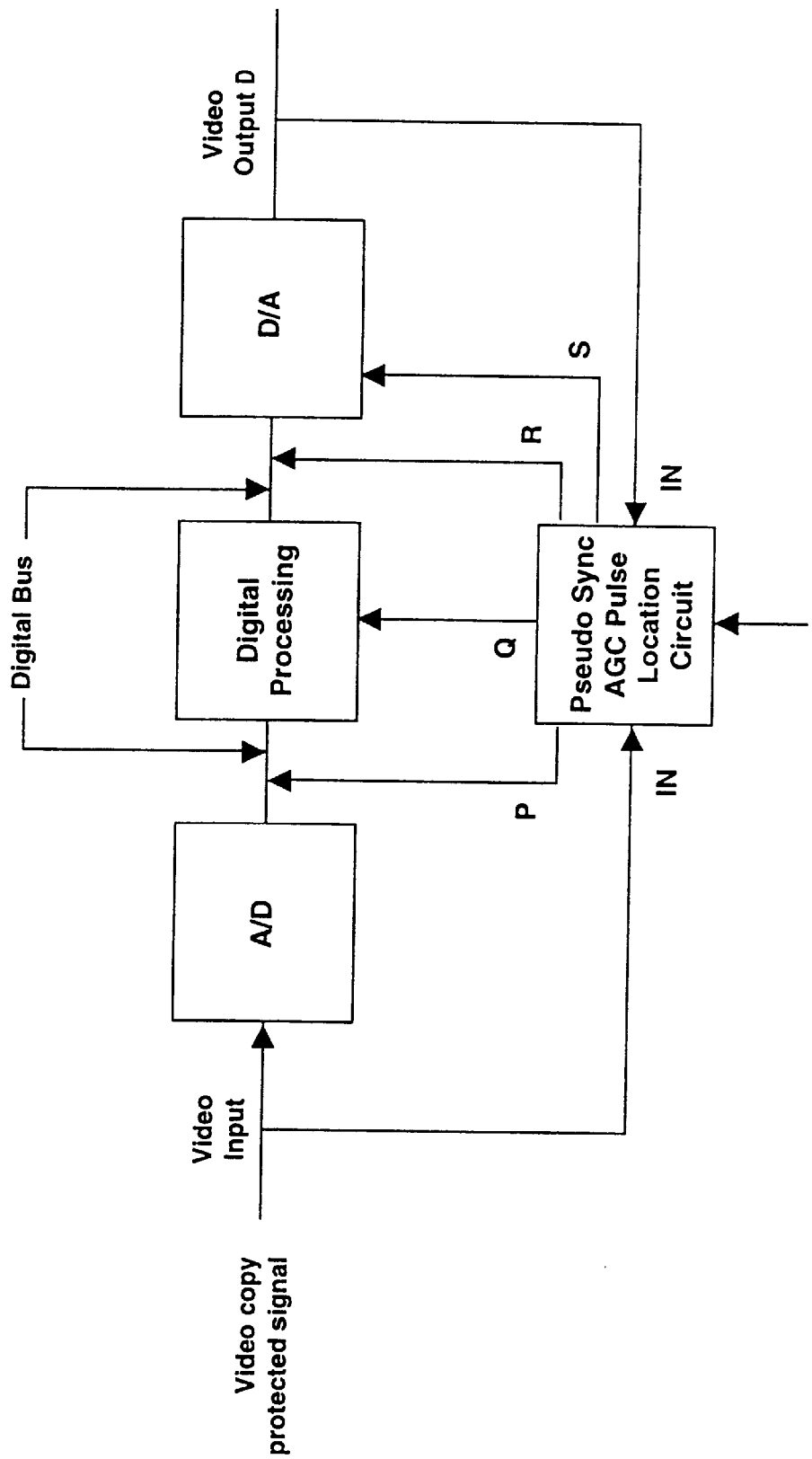
FIG. 5 shows a combination analog and/or digital circuit.

FIG. 5 shows a combination analog and/or digital circuit [consisting i.e. (sync separators, one shot timing circuits, logic, or counters and digital line location as described in '901 Ryan)] that samples the analog video input and or the analog video output D to generate pulses coincidental to pseudo syncs and or AGC pulses. The outputs of this circuit are the combination of P, Q, R. S which effectively eliminate the video anticopy protection the digital domain. For example "Q" can be a pulse coincidental with the video lines associated with the copy protection add pulses. "Q" can be used to switch off, attenuate, level shift, narrow the copy protection added pulses as to make a recordable VCR copy or to substantially eliminate the copy protection.

Description of Reducing the Effects of or Eliminating Colorstripe Copy Protection Signals Digital methods can also be applied to effectively eliminate or correct the "color stripe" (burst phase modulation) protection process and or enhanced video copy protection signals in the digital domain.

As was extensively discussed in the '155 application, it is first necessary to determine what TV lines contain the Colorstripe process and then modify the Colorstripe signal so as to make the copy protected signal recordable.

Figure 6:
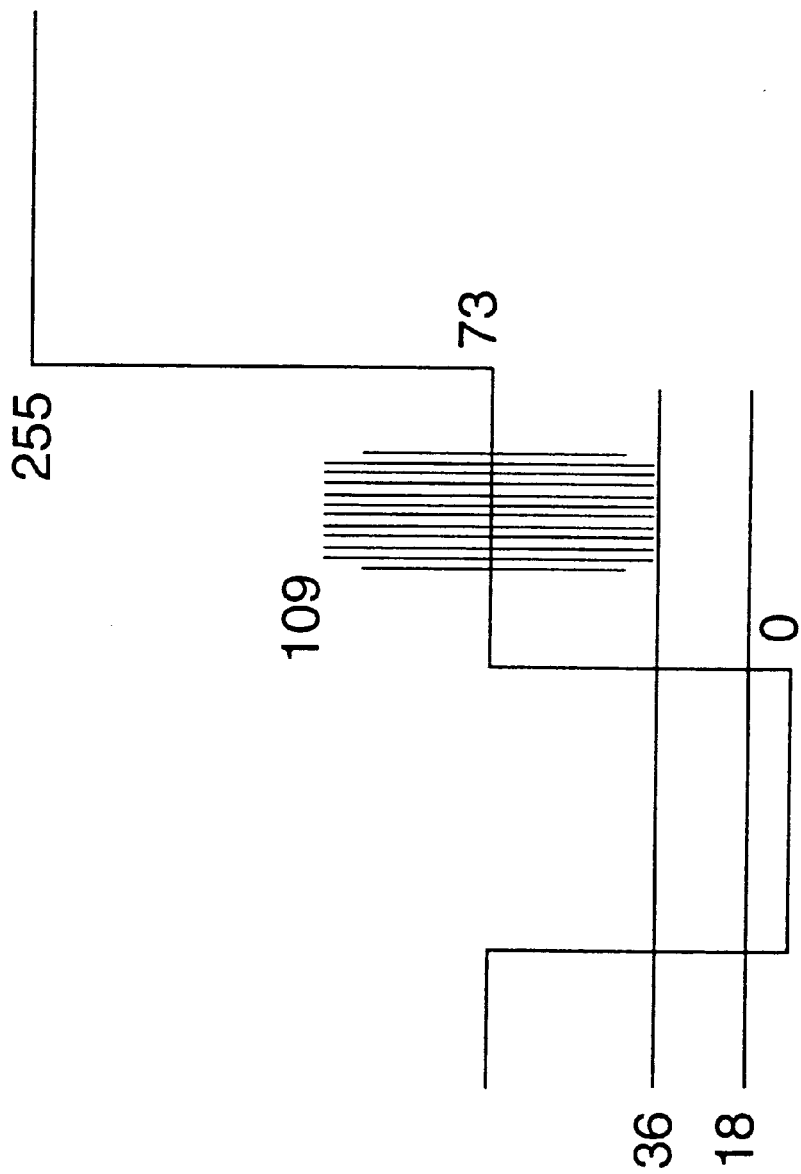
FIG. 6 shows the relative 8 bit levels of a video signal.

FIG. 6 defines the digital signal is by the relative 8 bit levels of a video signal. For instance, sync tip is defined as 0 and peak white is level 255. Color burst is between level 36 and 109, and blanking level is at 73. Other bit rates are possible. An 8 bit signal is used as an exemplary version. The "Colorstripe" signal as described needs to have the enough of the phase shifted color burst corrected to allow acceptable recording to be made. For instance if the phase shift is set for 180 degrees, an EPROM (erasable programmable memory),is used to map the color burst levels numbers to new ones that is a mirror image around level 73(blanking level). For instance if the burst level from Video source during is level 109, the output of the EPROM will be level 36.

Figure 7:
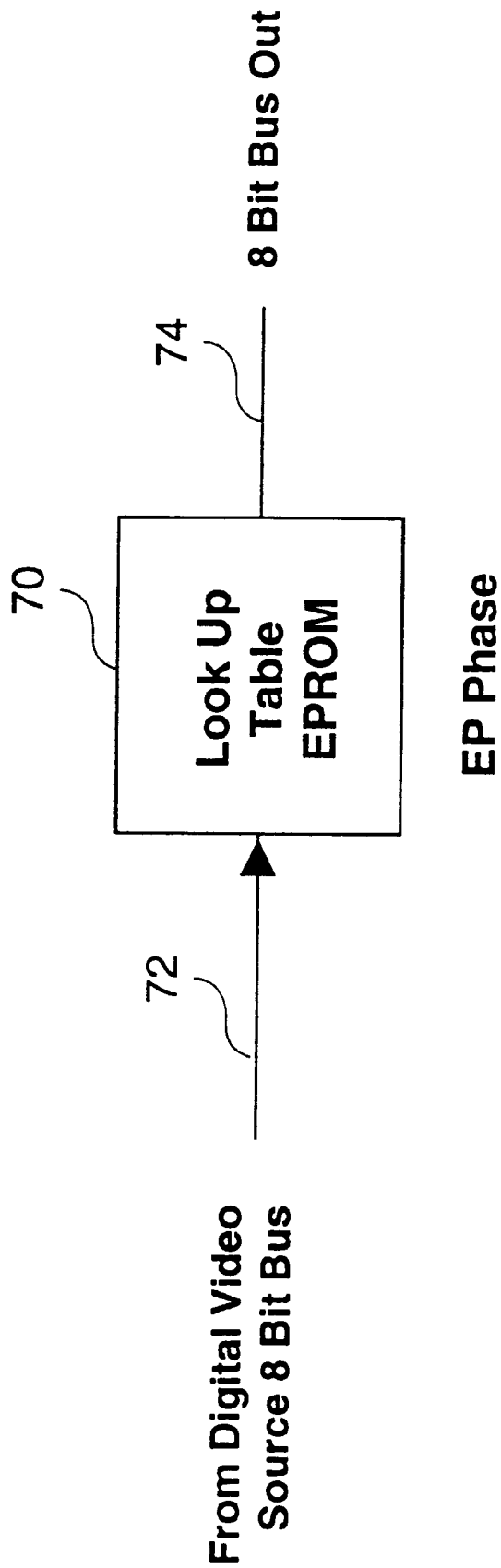
FIG. 7 shows an eight bit digital phase inventor.

FIG. 7 shows a way to create a phase shift for digitized color burst. For instance if the phase shift is set for 180 degrees, EPROM(erasable programmable memory),EP PHASE 70 will map the color burst levels numbers to new ones that is a mirror image around level 73 (blanking level). For instance if the burst level from Dvideo Source 72 is level 109, the output of EP PHASE will be level 36.

Figure 8:
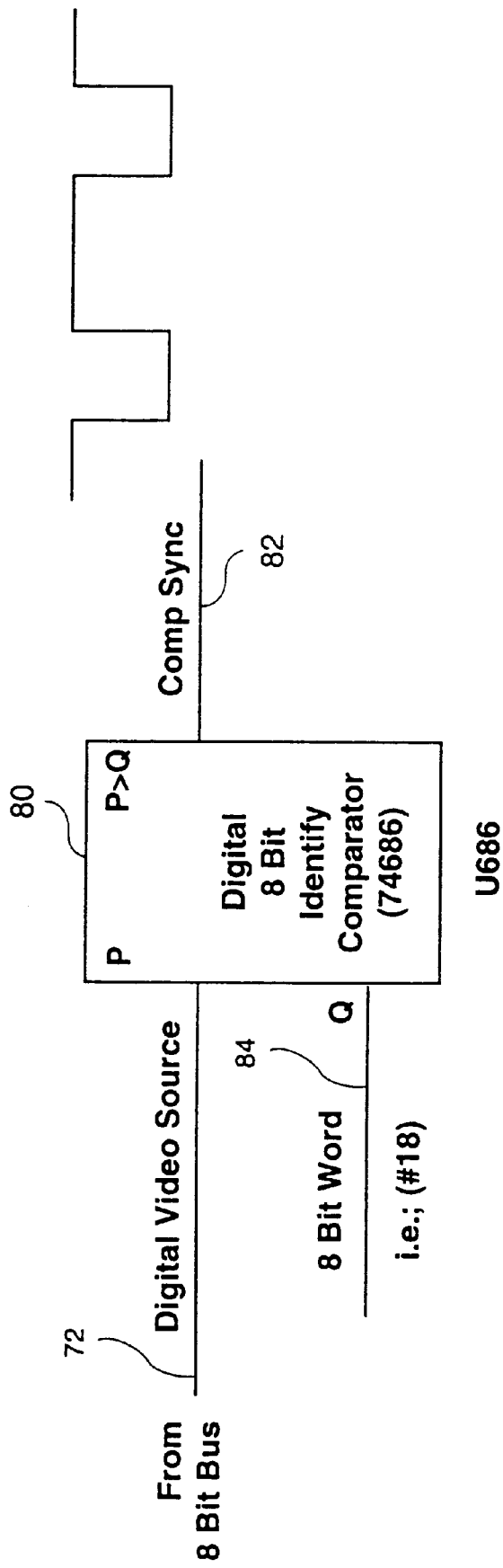
FIG. 8 shows a digital sync separator circuit.

FIG. 8 shows a digital sync separator circuit. The digital video source (i.e. 8 bit bus) is input into the "P" input of U686 80, a digital 8 bit identity comparator(a circuit such as the 74686 by Texas Instruments). The Q input is an 8 bit word such as 18. The output of U686 82 then will be high for when the digital video source is greater than level 18. As seen on FIG. 8, then the output of U686 80 is a waveform representing composite sync (including pseudo sync as well).

Figure 9:
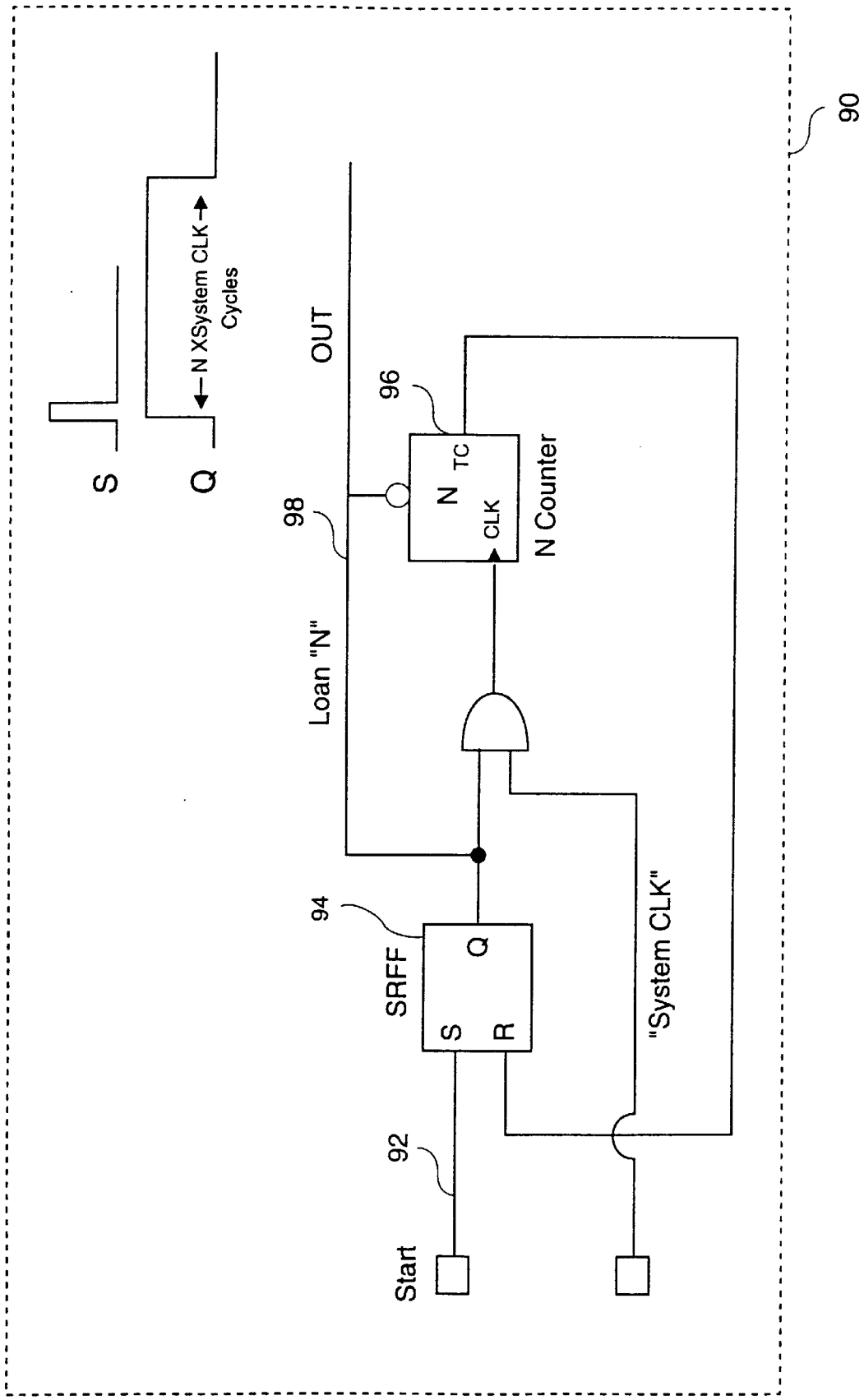
FIG. 9 shows a Digital Timing Pulse Generator

FIG. 9 shows a Digital Timing Pulse Generator(DTPG) 90 circuit equivalent to a very precise one shot multivibrator. An Incoming Pulse 92 is used to trigger the start input of flip flop SRFF 94 such that SRFF's Q output is high which in turn allow system clock(i.e. pixel clock such as 14.318 MHz in NTSC) to start N Counter 96 to count until N. When N counter gets up to N the TC output resets SRFF and the Q output goes low and load "N" into N counter to reset the N counter. The Output of SRFF 98 is a pulse that is equal to N times the pixel(system) clock duration.

Figure 10:
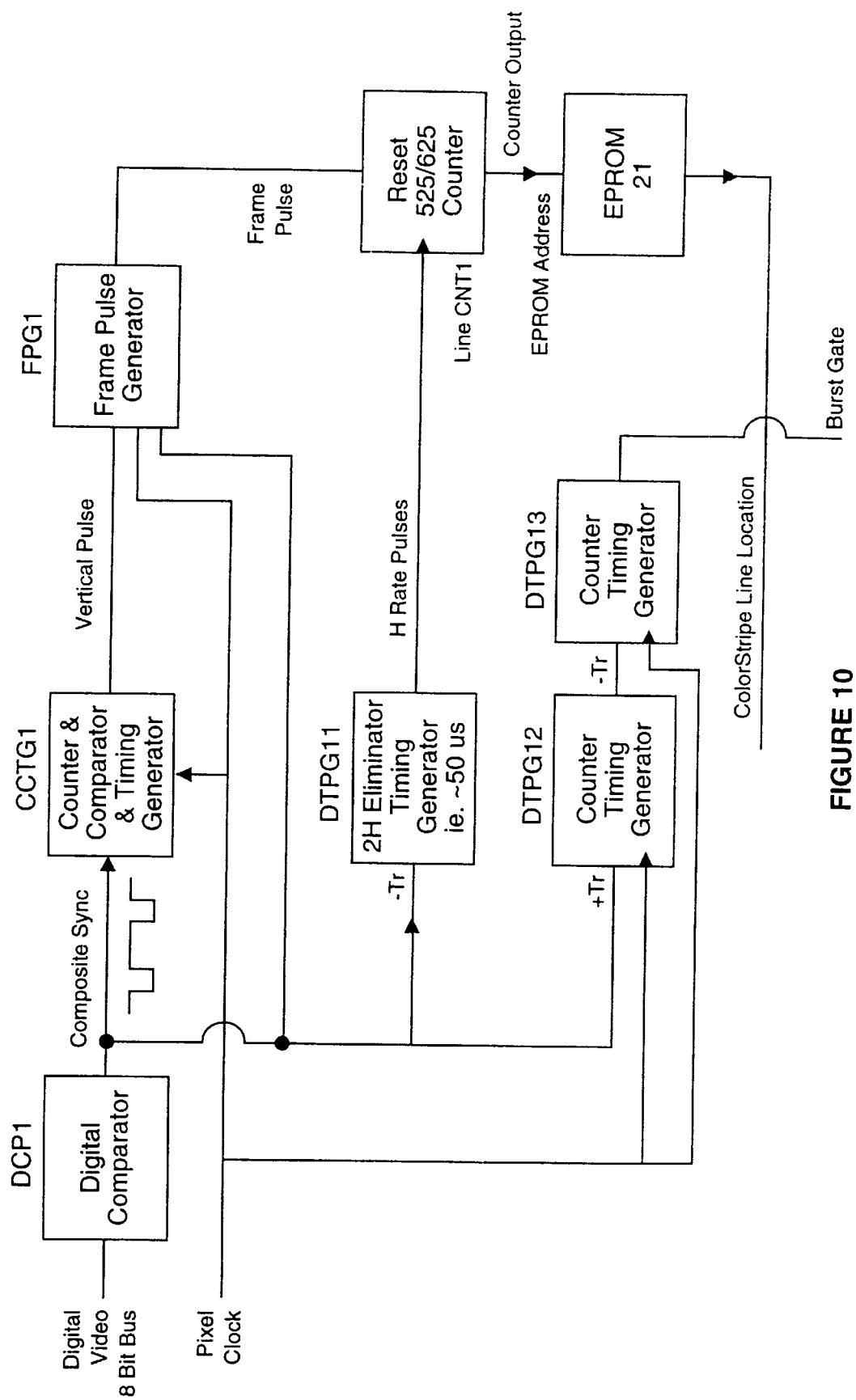
FIG. 10 shows a block diagram of generating Colorstripe line location and burst gate generation.

FIG. 10 shows a block diagram on how color stripe location TV lines are generated via EPROM 21 and burst gate pulses are generated via DTPG 12 and 13. The copy protected digital video is typically an 8 (to 10) bit bus which inputs into digital comparator DCP1 to sense sync pulses. The output of DCP1 is then composite sync (including pseudo syncs) DCP1 then is fed to counter and comparator CCTG1 to sense the vertical sync pulses, for example the first vertical broad pulse (in NTSC line 4 in field 1 and last half of 266 in field 2). See ANSI/SMPTE Standard 170M-1994, FIG. 7. The pixel clock (i.e. 14.318 MHz in some NTSC systems) is used in CCGT1 to count pulses that would sense the vertical sync broad pulse. The output of CCTG1 is then a pulse high with each first vertical sync pulse. This then feeds into a frame pulse generator circuit, FPG1. FPG1 also has composite sync from DCP1 and pixel clock fed to it. FPG1 uses the vertical pulse from CCGT1 to start a digital one shot with the pixel clock to last about 6 lines. Then another digital one shot in FPG1 triggers the end of the 6 lines one shot for about 3 microseconds. This 3 microsecond one shot is then high during the horizontal sync pulse timing of line 10 field one, and the 3 microsecond one shot is high during the middle of line 272, field 2. FPG1 uses combination logic to "and" the 3 microsecond one shot output with composite sync from DCP1. During field 1, the output of this "and " gate in FPG1 is low (because line 10's sync pulse is a logic low). During field 2, the output of this "and" gate is high because line 272 is logic high in the middle of its line when sync separated via DCP1. The output of FPG1 is then a pulse that is high for even fields and low for odd fields.

Composite sync is fed to about 50 microsecond non retriggerable digital one shot, DTPG 11. The output of DTPG1 then is horizontal rate pulses. The output of DTPG11 is fed to the clock input of a counter with the output of FPG1 to reset this counter, LINECNT1. LINECNTI output is multibit that counts to 525 in NTSC or 625 in PAL or SECAM. LINECNT1 output is fed to the address input of EPROM 21. The output of EPROM 21 then is programmed such that a logic high is on during the identified lines containing color stripe.

To generate a burst gate, composite sync from DCP1 is fed to digital one shot or delay circuit DTPG 12. DTPG12 is timed for its trailing edge to coincide with the start of color burst. DTPG12 output then triggers DTPG13 to generate a pulse that is coincident with the color burst.

Figure 11:
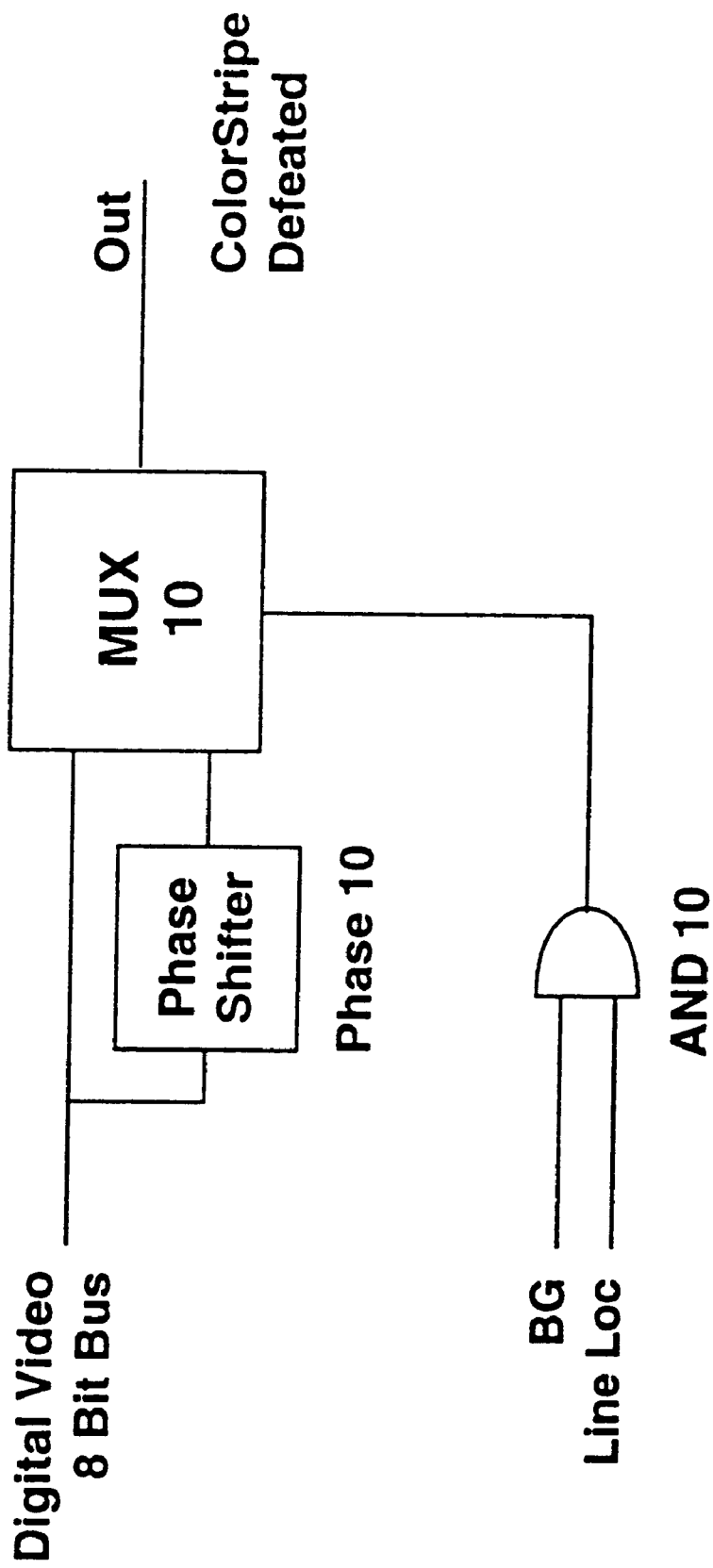
FIG. 11 shows a multiplexing embodiment of defeating the affects of Colorstripe.
Figure 13:
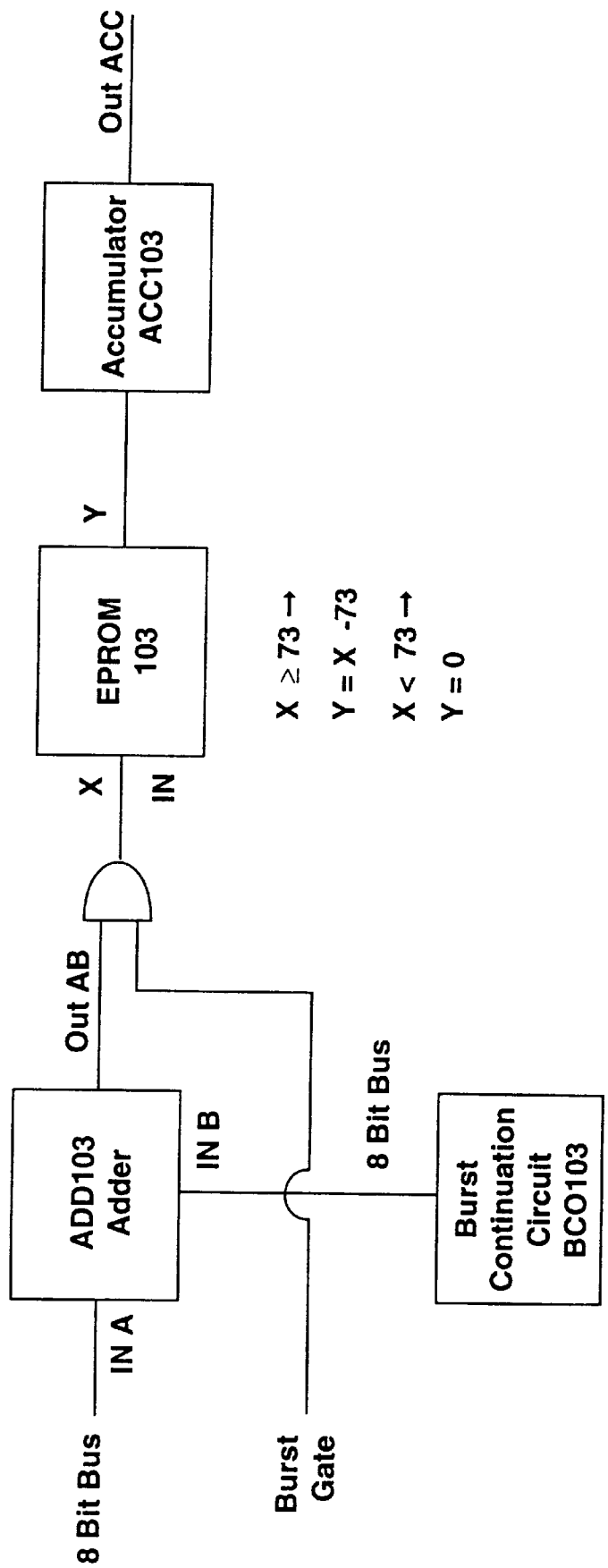
FIG. 13 shows an embodiment using a digital phase detector.

FIG. 11 shows a way to multiplex via MUX10 a corrected color burst phase via circuit PHASE 10 (see FIG. 13). Burst gate and color stripe line location pulses from FIG. 17 are "Anded" via AND 10 to switch in corrected color burst phase in the digital domain which results in a recordable video with the color stripe process defeated.

Figure 12:
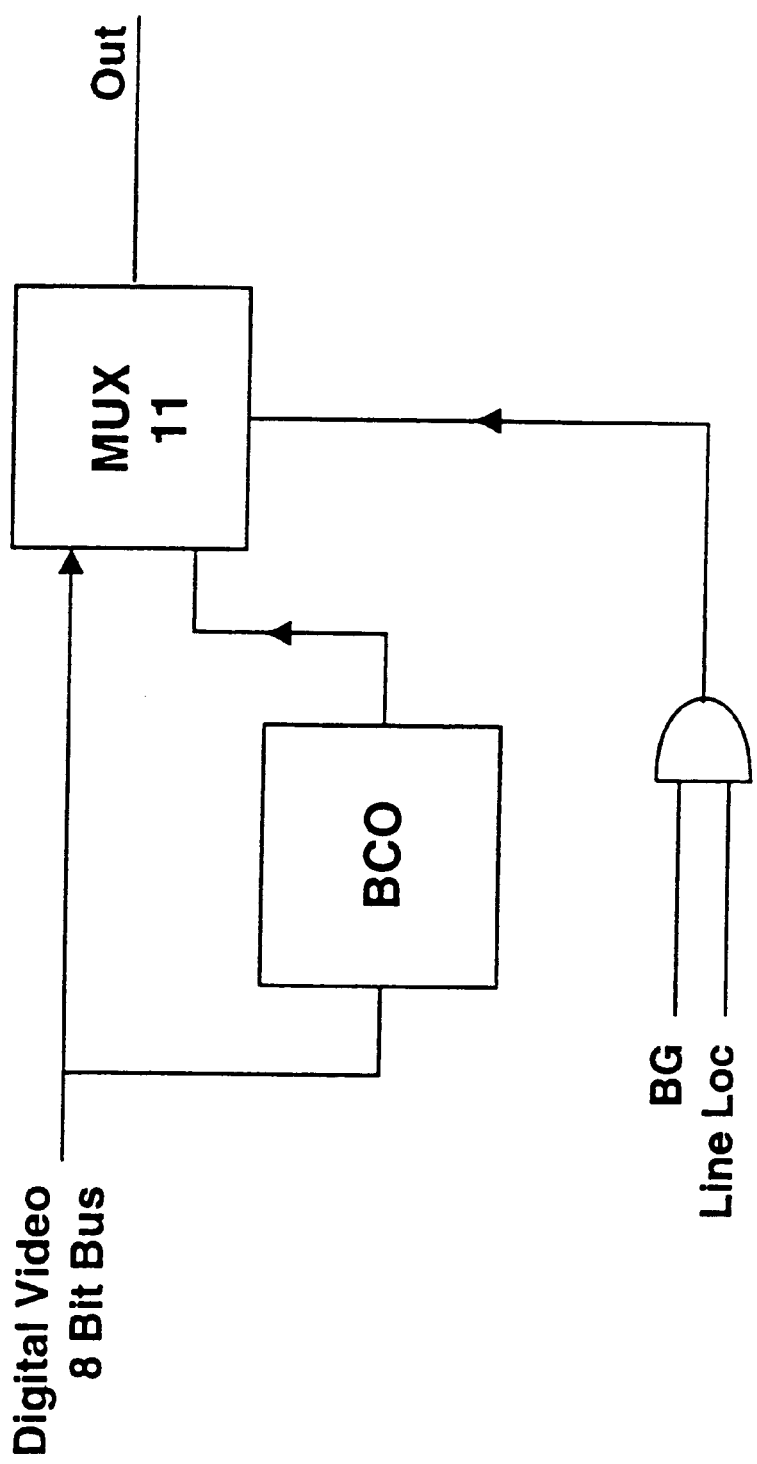
FIG. 12 shows an embodiment of defeating the effects of Colorstripe by using a digital burst continuation oscillator.

FIG. 12 shows another way of defeating Colorstripe by using a digital Burst Continuation Oscillator, BCO, (See Philips Desktop Video Data Handbook (1992) page 2–26). The digital video bus is input into a BCO. The output of the BCO is input into MUX11, a multiplexer. Control of MUX11 can be BG, burst gate from FIG. 10 to replace all burst with corrected color digital burst. Using the Colorstripe line location pulse and burst gate, MUX11 can replace only those Colorstripe color burst with corrected color burst in the digital domain. Either way, a recordable copy can be made.

There are several methods that can be used for a digital phase detector. The first one is seen at page 2–17 of the Philips 1992 Desktop Video Data Handbook published by Philips Semiconductors.

Figure 14:
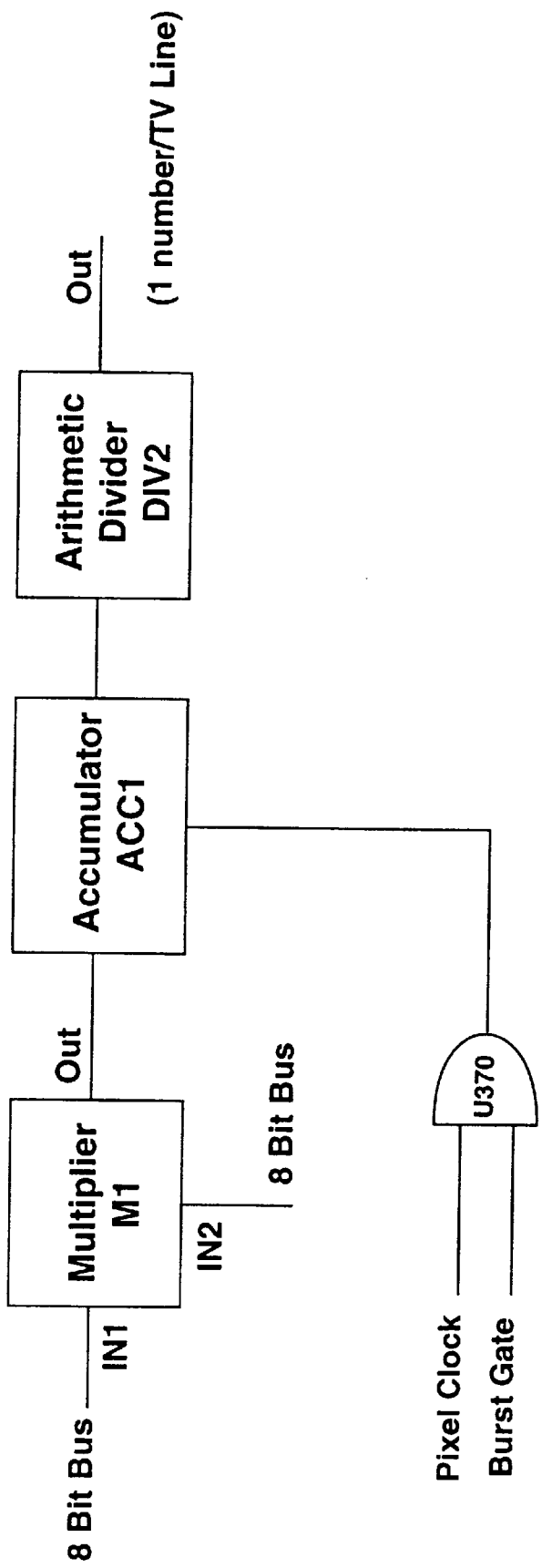
FIG. 14 shows an embodiment of detecting Colorstripe burst without using a phase detector.

A second example is FIG. 14. On circuit M1 (digital multiplier), IN1 is an input for the digital video containing Colorstripe bursts while IN2 is the input for the color burst digital burst continuation circuit(i.e. oscillator or correct burst replication circuit in the digital domain). The output of M1 is then the product in IN1 and IN2. M1 is a digital arithmetic multiplier such as a circuit using Texas Instruments 74284 and other integrated circuits. The output of M1 is the product of IN1 and IN2 at pixel rate. Accumulator ACC1 sums the output of M1 for up to 32 times(representing up to 8 subcarrier cycles) via output of U370. The output of ACC1 then is arithmetically divided via DIV1 by for example, 32 to result in the average of the output of M1. The output of DIV1 is then a number that occurs once a line when color burst is present(color stripe or normal burst). For those lines containing Colorstripe, the output of DIV1 will be differently detectable from those lines containing normal color burst.

Another embodiment of a way to detect Colorstripe burst without using a phase detector, is to use an adder as shown in FIG. 13. Basically the output of the burst continuation circuit(representing the correct burst phase) is added to the burst signal each horizontal line. With lines of correct color burst phase, the output of the adder (ADD103) will be twice amplitude color burst. If however lines containing color stripe burst are present, the output of the adder, ADD103 will be much smaller than twice amplitude color burst. The output of ADD103 is gated via AND gate U37 into EPROM 103. EPROM 103 then is programmed to clip off the levels below blanking and subtract off blanking level (#73). The output of EPROM 103 then is fed to accumulator ACC 103 to sum the numbers (about 32 for 8 cycles of color burst). If Colorstripe is present, the number from ACC 103 (one number per horizontal line) will be lower than if correct color burst were present.

This disclosure is illustrative and not limiting. All discussion in this specification have referenced the NTSC format. However, the concepts are equally applicable to the PAL and SECAM formats. Further modifications will be apparent to one skilled in the art and are intended to fall within the scope of the appended claims.

I claim:

1. A method of removing the effects of pseudo sync and AGC pulse pair copy protection signals within a video signal while in the digital domain, the copy protection signals being for inhibiting the making of acceptable analog video recordings of the video signal after digital to analog conversion, the method comprising:

determining in which lines of the video signal said copy protection signals are present;

wherein the act of determining comprises, counting a predetermined number of lines in a vertical blanking area from vertical sync, which predetermined lines contain the copy protection signals, and outputting a control signal;

modifying the copy protection signals while in the digital domain in at least some of those lines whereby an acceptable video recording of the video signal after digital to analog conversion can be made;

wherein the act of modifying includes;

inputting a digital video signal to a first signal input of a multiplexer;

inputting a digital number into a second signal input of said multiplexer; and inputting said control signal into a control input of said multiplexer.

2. A method of digitally reducing the effects of pseudo sync and/or AGC pulse copy protection signals within a digital video signal having normal sync pulses, wherein the copy protection signals allow viewing said digital video signal while inhibiting the making of acceptable analog video recordings of said digital video signal after digital to analog conversion, the method comprising:

digitally generating a digital control signal indicative of selected lines of the video signal in which said copy protection signals are present;

providing a selected digital modification signal; and digitally modifying in response to said digital control signal, with said selected digital modification signal, said copy protection signals in less than all of said selected lines of said digital video signal in which the copy protection signals are present but a sufficient number of the selected lines to allow an acceptable video recording of said digital video signal to be made after the digital to analog conversion.

3. The method of claim 2, including:

generating the digital control signal for a predetermined number of lines in a vertical blanking area of said video signal; and digitally modifying only a sufficient number of the predetermined number of lines with the digital modification signal as required to enable the making of an acceptable video recording.

4. The method of claim 2, wherein the act of digitally modifying comprises:

inputting the copy protected, but viewable, digital video signal to a first input of a digital level shifting circuit;

applying the control signal to a control input of the digital level shifting circuit during said presence of said copy protection signals within said less than all but sufficient number of selected lines of the digital video signal; and digitally controlling via the level shifting circuit an amplitude of selected portions of said selected lines of the digital video signal which will reduce the effects of the copy protection signals.

5. The method of claim 2, wherein the act of digitally modifying comprises:

inputting the copy protected but viewable digital video signal to a first input of an attenuating circuit;

applying the control signal to a control input of the attenuator circuit during said presence of said copy protection signals within said less than all but sufficient number of selected lines of the digital video signal; and attenuating via said attenuating circuit said selected lines of said copy protection signals to reduce the effects of the copy protection signals.

6. The method of claim 2 wherein the act of digitally modifying includes:

increasing an amplitude of said normal sync pulses relative to said pseudo sync pulses in said less than all but sufficient number of selected lines, to allow an acceptable video recording of said digital video signal to be made alter digital to analog conversion.

7. A method of digitally reducing the effects of chroma copy protection signals of improper phase within a digital video signal, wherein the copy protection signals allow viewing said digital video signal while inhibiting the making of acceptable analog video recordings of said digital video signal after digital to analog conversion, the method comprising:

inputting the copy protected but viewable digital video signal to a first input of a digital multiplexer and to a digital burst circuit;

digitally determining the location of the chroma copy protection signals within selected lines of said digital video signals;

digitally supplying a digital control signal indicative of the presence of the chroma copy protection signals in selected lines of the digital video signal to a control input of said digital multiplexer;

applying the output of the digital burst circuit to a second input of the digital multiplexer; and digitally replacing, in response to said digital control signal, a sufficient portion of the chroma copy protection signals with a chroma signal of a proper phase, to allow an acceptable video recording of said video signal to be made after digital to analog conversion.

8. The method of claim 7 wherein the act of digitally replacing the chroma copy protection signals includes:

applying the digital video signal to a digital phase inverter comprising said digital burst circuit; and supplying a chroma signal of the opposite phase to the second input of the digital multiplexer.

9. The method of claim 7 wherein the act of digitally replacing the chroma copy protection signals includes:

applying the digital video signal to a digital phase shifter comprising said digital burst circuit; and supplying a chroma signal of shifted phase to the second input of the digital multiplexer.

10. An apparatus for digitally removing the effects of pseudo sync and AGC pulse copy protection signals within selected lines of a digital video signal, wherein the copy protection signals allow viewing said digital video signal while inhibiting the making of acceptable analog video recordings of said digital video signal after digital to analog conversion, comprising:

a digital processor receiving the digital video signal containing said copy protection signals;

a digital copy protection signal location detector for digitally locating selected lines in which the copy protection signals are present in the digital video signal;

said location detector digitally generating a multiplex control signal indicative of the presence of said copy protection signals in the selected lines;

a digital number generator for generating a predetermined digital number; and a digital signal modification circuit responsive to said multiplex control signal for digitally modifying said copy protection signals in at least some of the selected lines of said digital video signal which will allow an acceptable video recording of said digital video signal to be made after digital to analog conversion.

11. The apparatus of claim 10 wherein the digital signal modification circuit includes a digital multiplexer.

12. The apparatus of claim 10 wherein the digital signal modification circuit includes a digital anti-copy protection (ACP) circuit for defeating the copy protection signals.

13. The apparatus of claim 12 wherein said ACP circuit digitally modifies said copy protection signals by level shifting said pseudo sync pulses relative to normal sync pulses in the digital video signal.

14. The apparatus of claim 12 wherein said ACP circuit digitally modifies said copy protection signals by pulse narrowing said pseudo sync pulses and said AGC pulses.

15. The apparatus of claim 12 wherein said ACP circuit digitally modifies said copy protection signals by replacing selected pseudo sync pulses with normal sync pulses.

16. The apparatus of claim 12 wherein said ACP circuit digitally modifies said copy protection signals by increasing an amplitude of normal sync pulses relative to said pseudo sync pulses.

17. An apparatus for digitally removing the effects of chroma copy protection signals of improper phase within a digital video signal, wherein the copy protection signals allow viewing said digital video signal while inhibiting the making of acceptable analog video recordings of said video signal after digital to analog conversion, comprising:

a digital line location circuit for digitally determining the location of chroma copy protection signals within selected lines of said digital video signal; and a digital signal modification circuit responsive to said digital line location circuit for modifying, with a chroma signal of proper phase, a selected portion of said chroma copy protection signals which is sufficient to allow an acceptable video recording of said video signal to be made after digital to analog conversion.

18. The apparatus of claim 17 wherein said digital line location circuit comprises:

a digital comparator receiving said digital video input signal containing said chroma copy protection signals for generating a composite sync;

a counter/comparator/timing generator, a 2H eliminator timing generator and a first counter timing generator, all responsive to the digital comparator composite sync;

a frame pulse generator and the first and a second counter timing generator circuit responsive to a pixel clock along with the counter/comparator/timing generator;

wherein said counter/comparator/timing generator generates a vertical pulse which is coupled to said frame pulse generator;

wherein said pixel clock, said vertical pulse and the composite sync are applied to said frame pulse generator to produce a frame pulse;

a reset 525/625 counter responsive to the frame pulse and to said 2H eliminator timing generator for producing a digital signal indicative of lines containing said chroma copy protection signals; and wherein said first and second counter timing generators combine to produce a burst gate signal coincident with the chroma signal.

19. The apparatus of claim 17 wherein said digital signal modification circuit comprises:

a digital multiplexer receiving said digital video signal containing said chroma copy protection signals;

a digital phase shifter coupled from the digital video signal to a second input of said digital multiplexer; and an AND gate responsive to a burst gate signal and a copy protection line location signal for supplying a control signal to a third input of said digital multiplexer for controlling the time periods when the phase shifted digital video is coupled to an output of said digital multiplexer.

* * * * *